(12) United States Patent
Cocchi et al.

(10) Patent No.: US 11,187,443 B2
(45) Date of Patent: Nov. 30, 2021

(54) HEAT EXCHANGER

(71) Applicant: ALI GROUP S.R.L.—CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco Sul (IT)

( * ) Notice: Subject to any disclaimer, the term of this patent is extended or adjusted under 35 U.S.C. 154(b) by 56 days.

(21) Appl. No.: 16/407,893

(22) Filed: May 9, 2019

(65) Prior Publication Data

US 2019/0390879 A1 Dec. 26, 2019

(30) Foreign Application Priority Data

Jun. 20, 2018 (IT) .................. 102018000006520

(51) Int. Cl.
*F25B 39/02* (2006.01)
*A23G 9/16* (2006.01)
*F28D 7/10* (2006.01)

(52) U.S. Cl.
CPC ............... *F25B 39/02* (2013.01); *A23G 9/16* (2013.01); *F28D 7/10* (2013.01); *F25B 2339/0242* (2013.01)

(58) Field of Classification Search
CPC . A23G 9/18; A23G 9/045; A23G 9/10; A23G 9/12; A23G 9/222; A23G 9/16; F25B 29/02
See application file for complete search history.

(56) References Cited

U.S. PATENT DOCUMENTS

2012/0137719 A1 6/2012 Dong et al.
2013/0319645 A1* 12/2013 Hermansen ............. F28F 1/128
165/181

(Continued)

FOREIGN PATENT DOCUMENTS

EP 1035387 A1 9/2000
EP 1787525 A1 5/2007

(Continued)

OTHER PUBLICATIONS

Italian Search Report dated Feb. 19, 2019 for counterpart Italian Patent Application No. 10 2018000006520.

*Primary Examiner* — Cassey D Bauer
(74) *Attorney, Agent, or Firm* — Shuttleworth & Ingersoll, PLC; Timothy J. Klima

(57) ABSTRACT

A machine for making liquid/semi-liquid food products includes a container for the product; a dispenser connected to the container which allows or inhibits dispensing of the product; a mixing stirrer rotatable about an axis of rotation and mounted inside the container; a thermal system including a circuit with a heat exchanger fluid and an evaporator operatively associated with the container and including an inlet aperture for the fluid, a discharge aperture for the fluid, a first tubular element and a second tubular element coaxial with the first tubular element and having an axial direction of extension and a radial direction of extension, the second tubular element extending along an axial direction parallel to the axis of rotation and being disposed inside the first tubular element to define an annular chamber for circulating the fluid and defined by at least one microchannel, the microchannel having a hydraulic diameter of 3-13 mm.

26 Claims, 14 Drawing Sheets

(56) References Cited

U.S. PATENT DOCUMENTS

2013/0327080 A1* 12/2013 Sipp ................. A23G 9/228
 62/342
2014/0305618 A1* 10/2014 Newton ............. A23G 9/045
 165/154

FOREIGN PATENT DOCUMENTS

| EP | 2445356 A2 | 5/2012 |
| WO | 2012092929 A1 | 7/2012 |
| WO | 2013070450 A1 | 5/2013 |

* cited by examiner

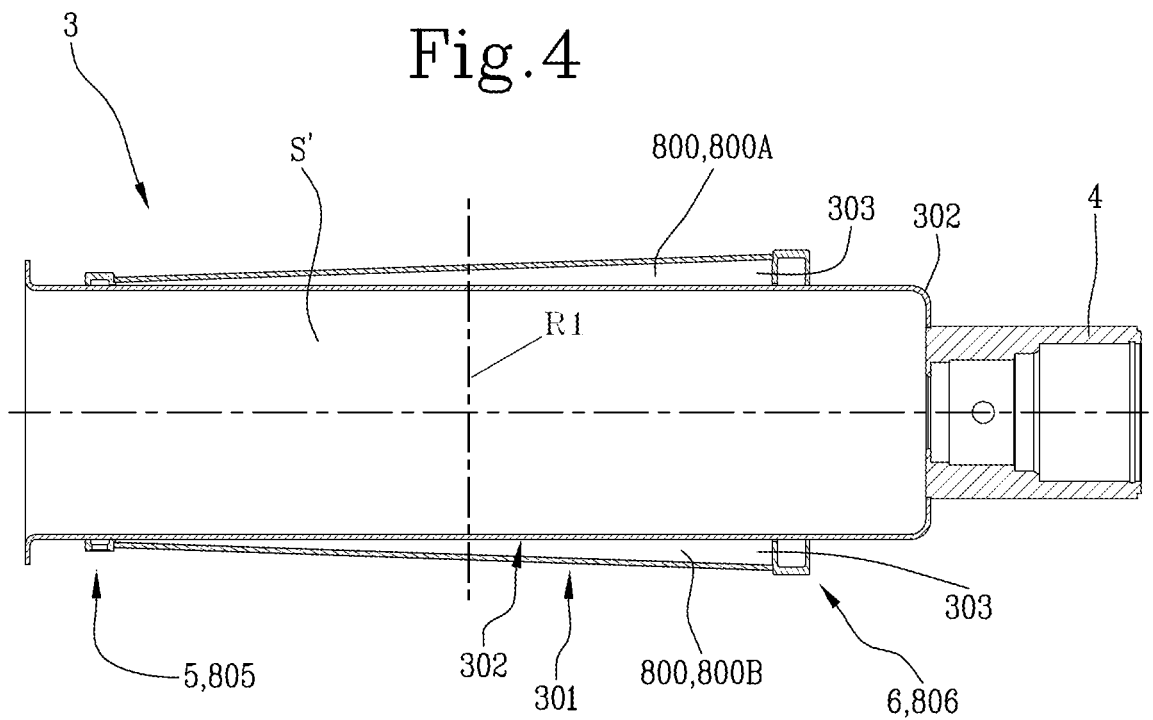
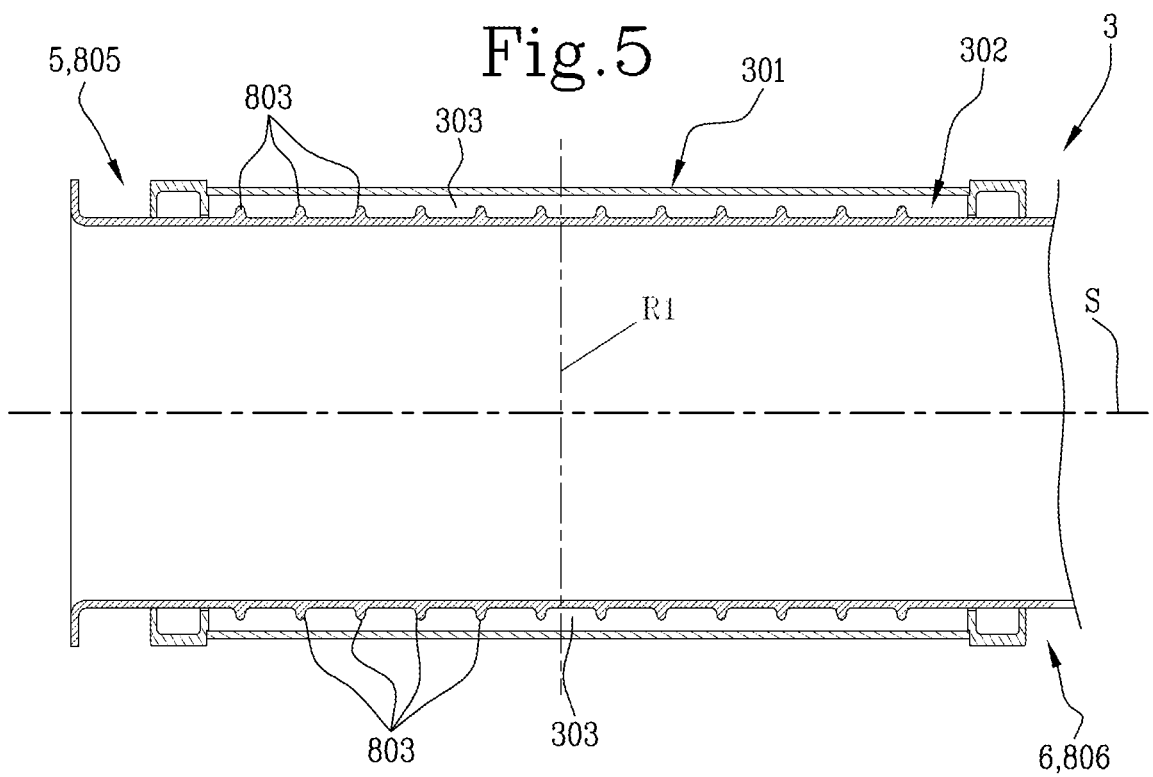

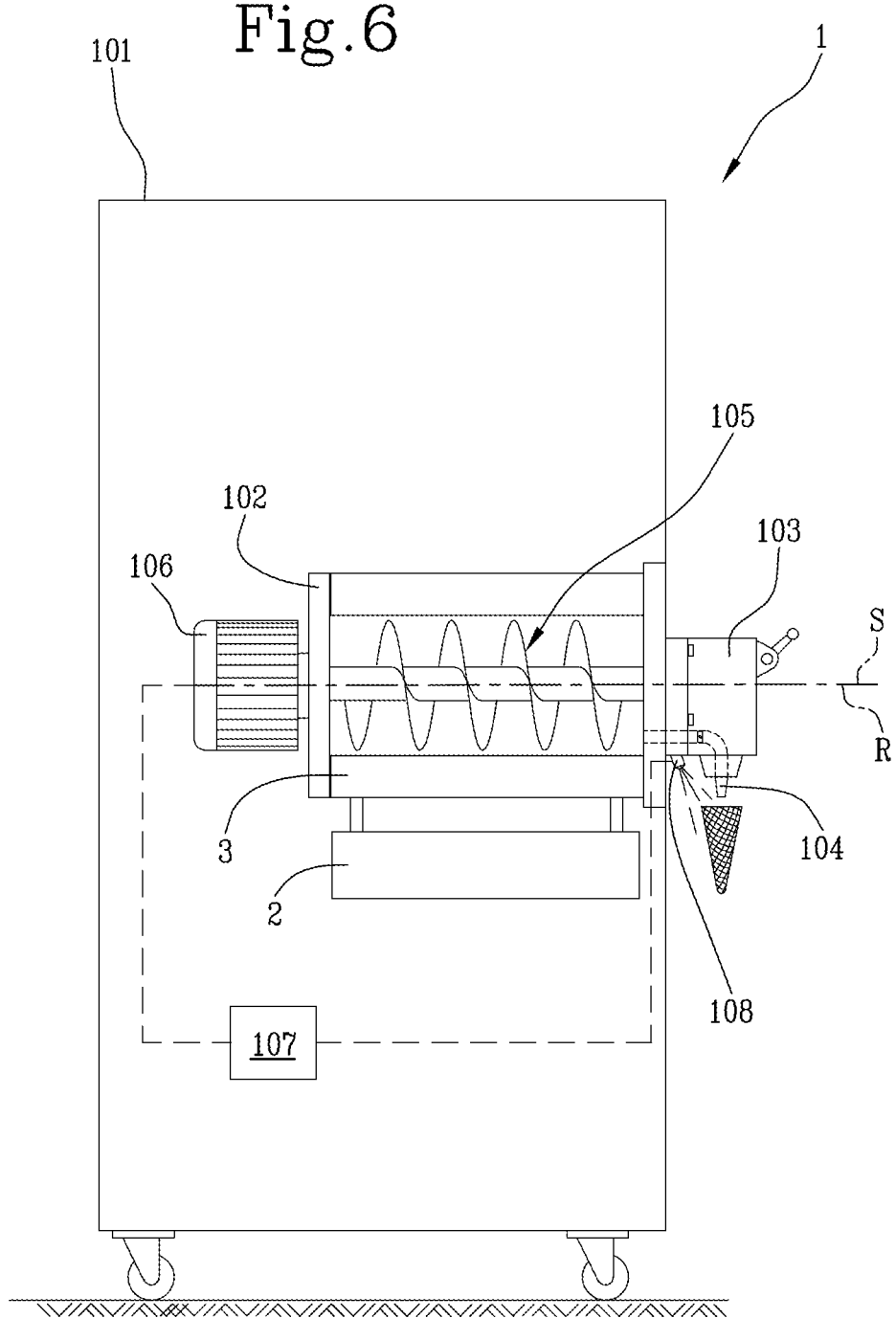

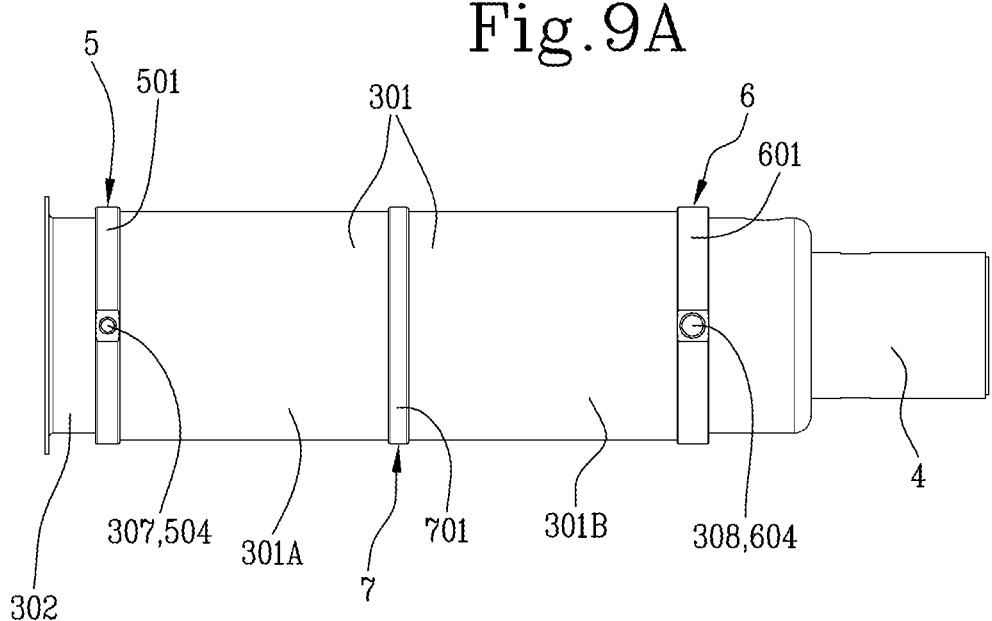
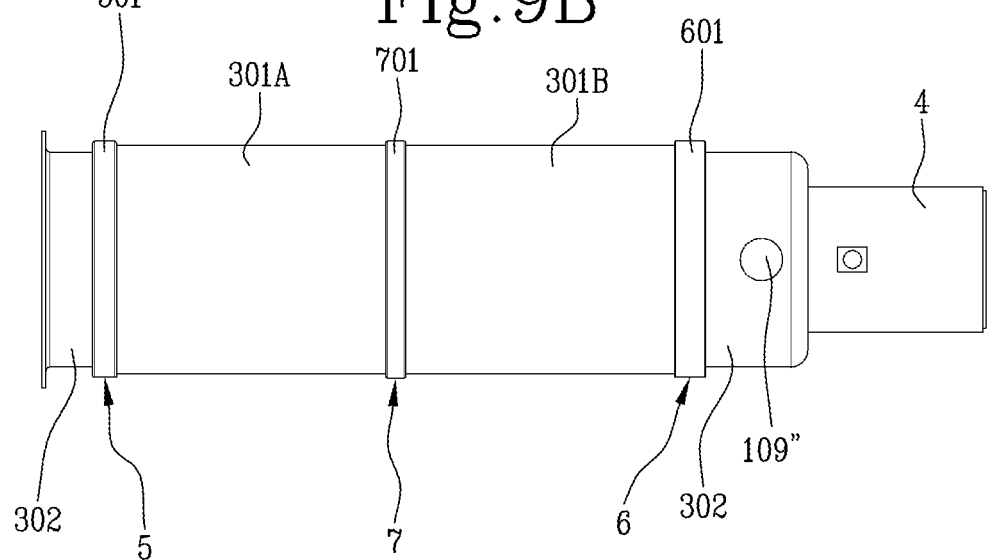

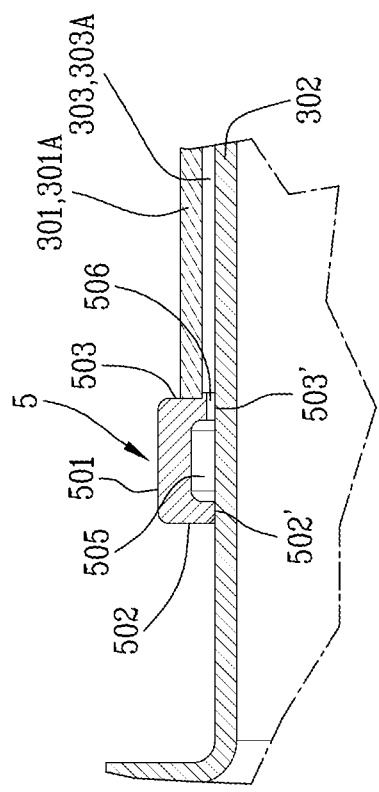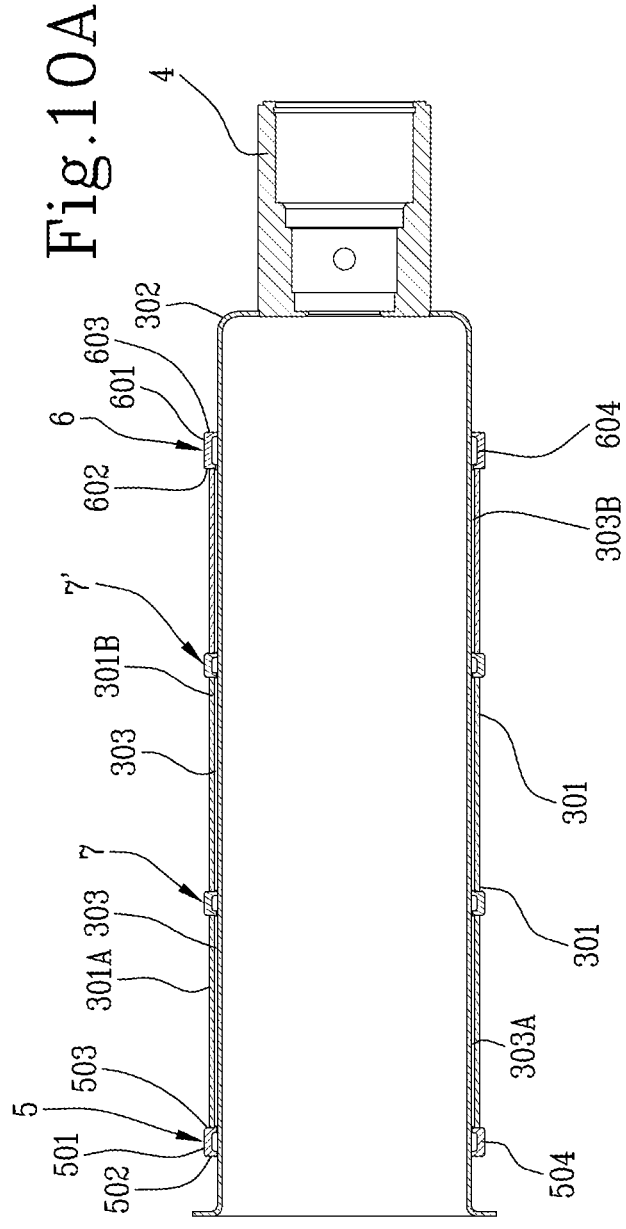

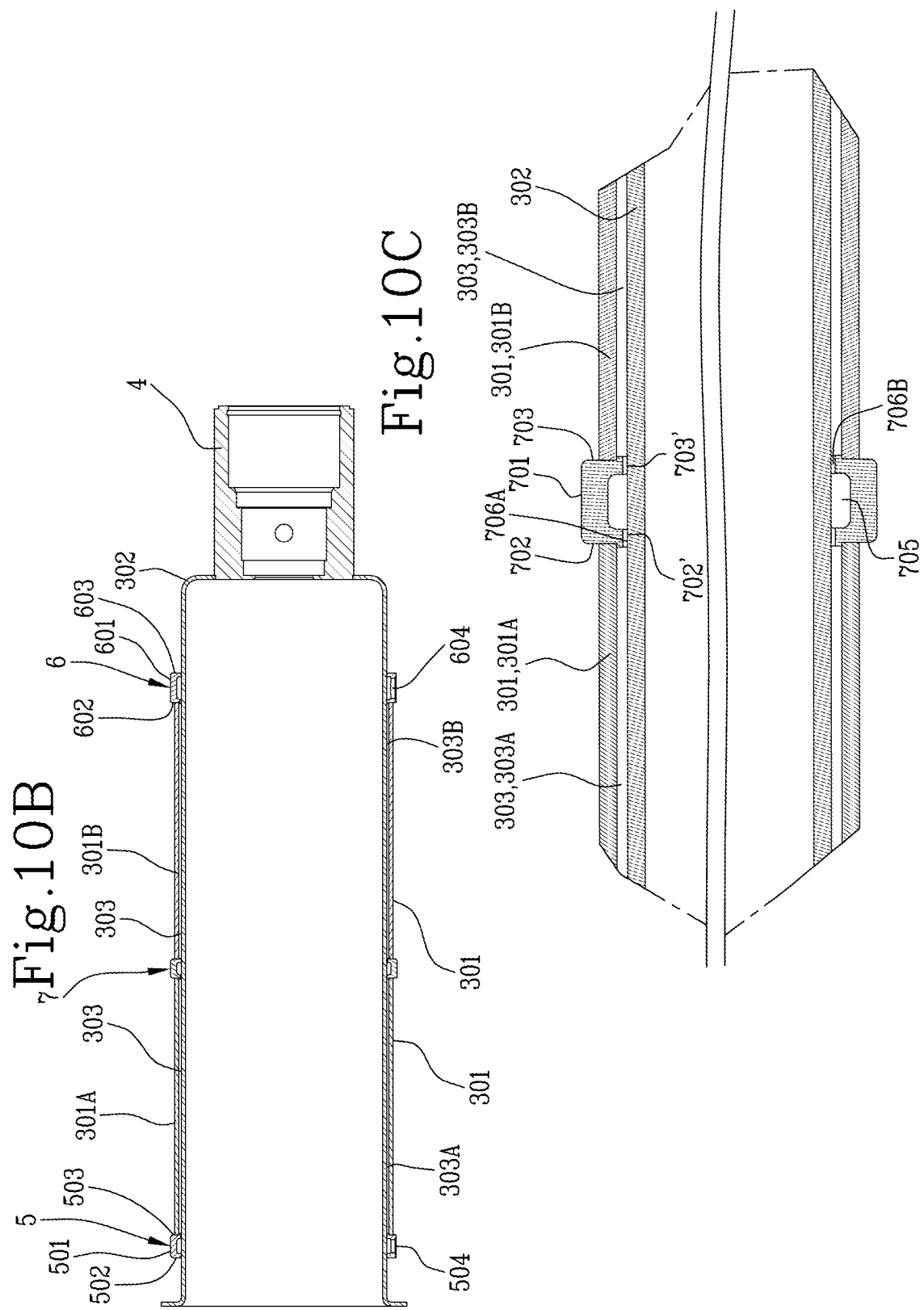

HEAT EXCHANGER

This application claims priority to Italian Patent Application IT102018000006520 filed Jun. 20, 2018, the entirety of which is incorporated by reference herein.

This invention relates to a machine for making and dispensing liquid or semi-liquid food products. A machine for making and dispensing liquid or semi-liquid food products is a machine designed to prepare substances which are used for the production, purely by way of example, of products such as ice cream, sorbets, soft ice cream, chilled patisserie products and granitas. In particular, such machines must have two basic properties: on the one hand they must be able to make the product being processed available and, on the other, they must be able to condition the product.

The machine thus has a container to hold the product being processed.

Accessibility of the product is generally obtained through a loading port where the base mixture is fed in and a dispensing mouth made on the container and controlled by a dispenser, where the finished product is dispensed. The dispenser, controlled manually or automatically, may allow or inhibit dispensing of the product through the dispensing mouth.

The product may be conditioned mechanically or thermally. Mechanical conditioning is achieved by means of a stirrer. Usually, the stirrer is in sliding contact with at least part of the inside surface of the container in order to prevent the product from building up or freezing thereon.

Thermal conditioning, on the other hand, is fundamental to the preparation of the product, whether hot or cold. Thermal conditioning is achieved by designing an exchanger configured to exchange heat with the product being processed inside the container. More specifically, in preferred machines, the heat exchanger absorbs heat from the product being processed in order to cool it and give the right consistency to the end product to be dispensed. To allow cooling the product being processed, the machine comprises a refrigeration system. Known in the trade are refrigeration systems of several kinds which are more or less adaptable to specific machine requirements. Whatever the case, all refrigeration systems contain a heat exchanger fluid, specifically a refrigerant fluid, which circulates in the refrigeration system. The refrigerant fluid performs a refrigerating cycle by flowing sequentially through a compressor, which increases its pressure, a condenser, which extracts heat from it to return it to the liquid state, a pressure reducing element, which reduces its pressure, and lastly, an evaporator, in which the refrigerant fluid receives heat from its surroundings (in the case of the machine, it receives heat from the product being processed) and returns to the gaseous state and/or varies its density (when $CO_2$ is used as refrigerant, in the traditional vapour compression cycle described above, the transfer of heat to the surrounding atmosphere does not lead to condensation of the fluid but rather to the progressive cooling of a dense gas phase).

The evaporator thus comprises a container for the product to be cooled and a chamber containing the refrigerant fluid. Known in the trade are machines which are used to make liquid or semi-liquid food products and which include tubular evaporators. Known in particular are evaporators comprising a helical coil disposed inside the annular chamber. In this configuration, the refrigerant fluid is forced into the helical path. This solution, although it increases the heat exchange surface, has two major drawbacks. On the one hand, load loss is increased on account of the reduced cross section of the passageway for the refrigerant fluid and, on the other, heat exchange efficiency is further reduced because the refrigerant fluid in the coil undergoes progressive heating which leads to non-uniform heat exchange even along the circumferential direction.

This invention has for an aim to provide a machine for making and dispensing liquid and semi-liquid food products to overcome the above mentioned disadvantages of the prior art.

This aim is fully achieved by the machine for making and dispensing liquid and semi-liquid food products according to this disclosure as characterized in the appended claims.

These and other features will become more apparent from the following detailed description of a preferred embodiment, illustrated by way of non-limiting example in the accompanying drawings, in which:

FIGS. 4 and 5 illustrate further embodiments of the heat exchanger applicable to a machine of this invention;

FIG. 6 illustrates a machine of this invention for making and dispensing liquid or semi-liquid food products;

Figure 1:
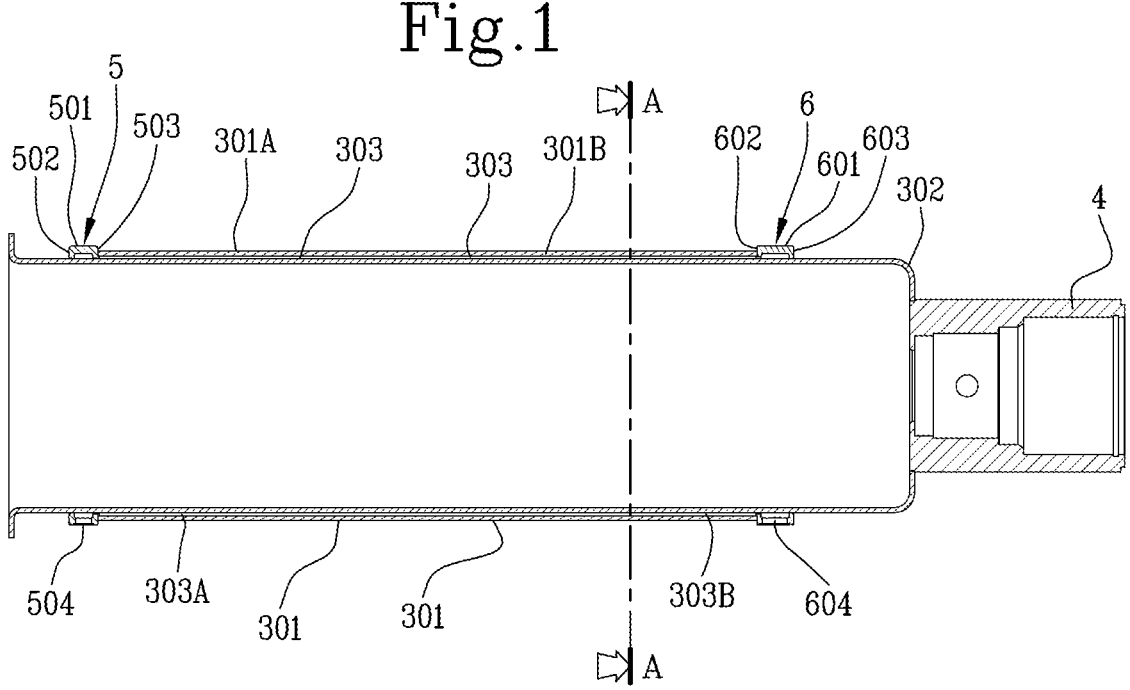
FIG. 1 illustrates an embodiment of a heat exchanger applicable to a machine of this invention.
Figure 2:
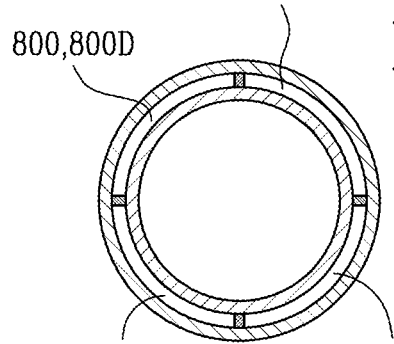
FIG. 2 is a cross section of the heat exchanger of FIG. 1 through a section plane A-A.
Figure 3:
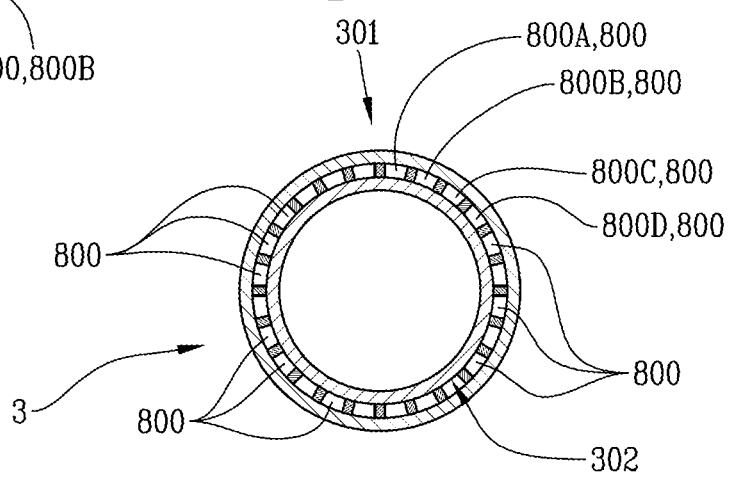
FIG. 3 shows a cross section of a further embodiment of the heat exchanger applicable to a machine of this invention.
Figure 6A:
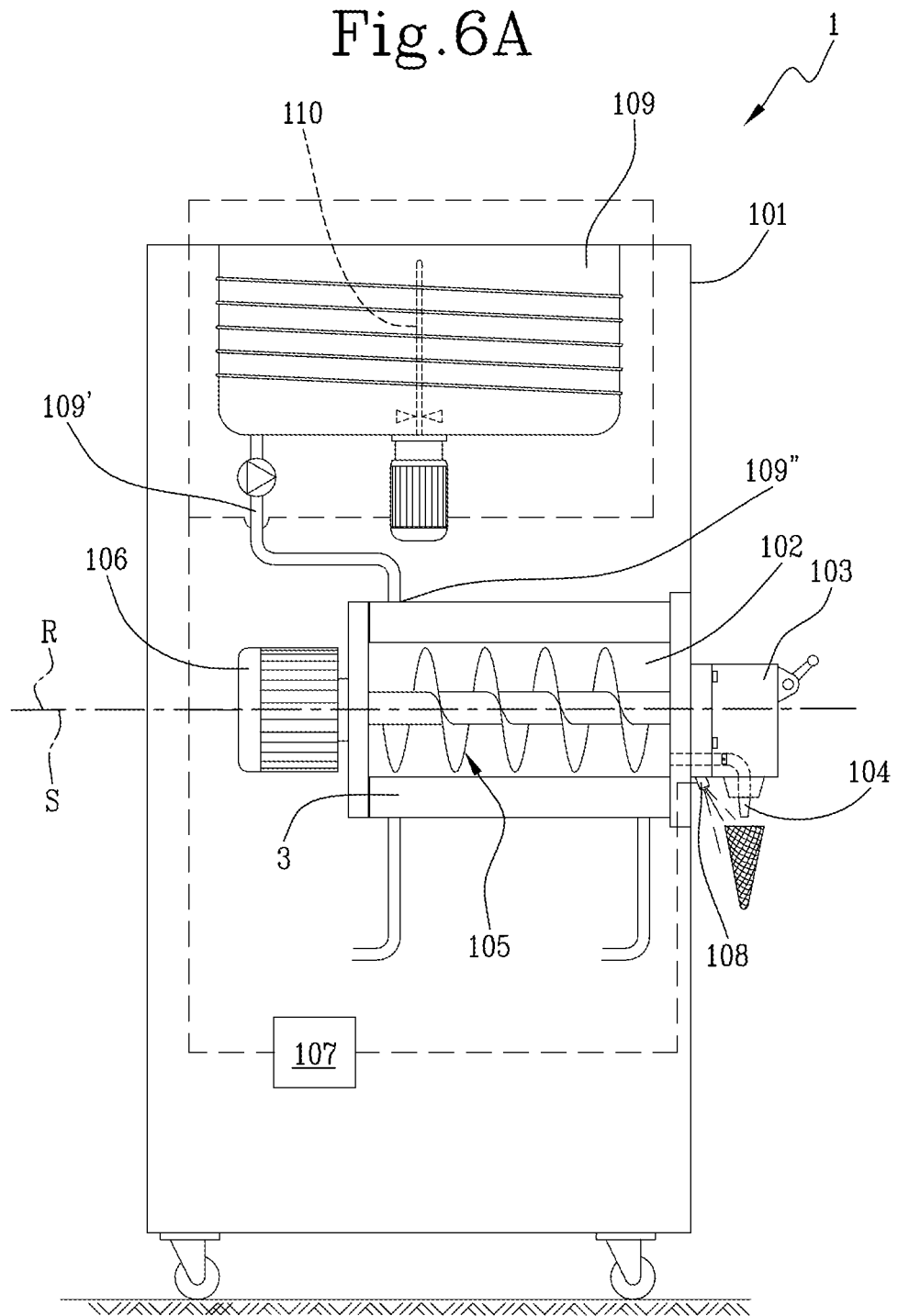
FIG. 6A illustrates the machine of FIG. 1 and shows also a pre-mixing tank.
Figure 7:
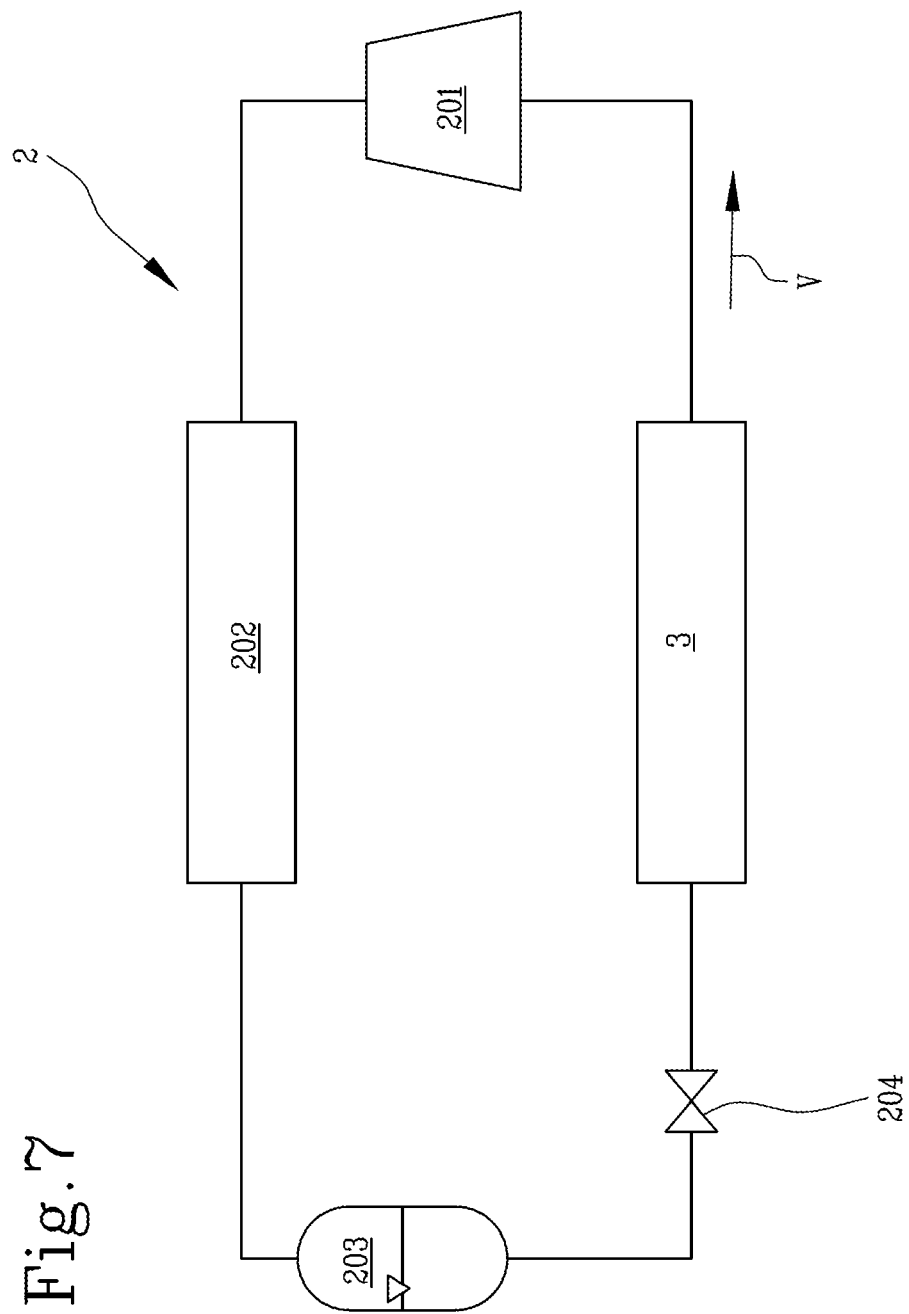
Figure 8A:
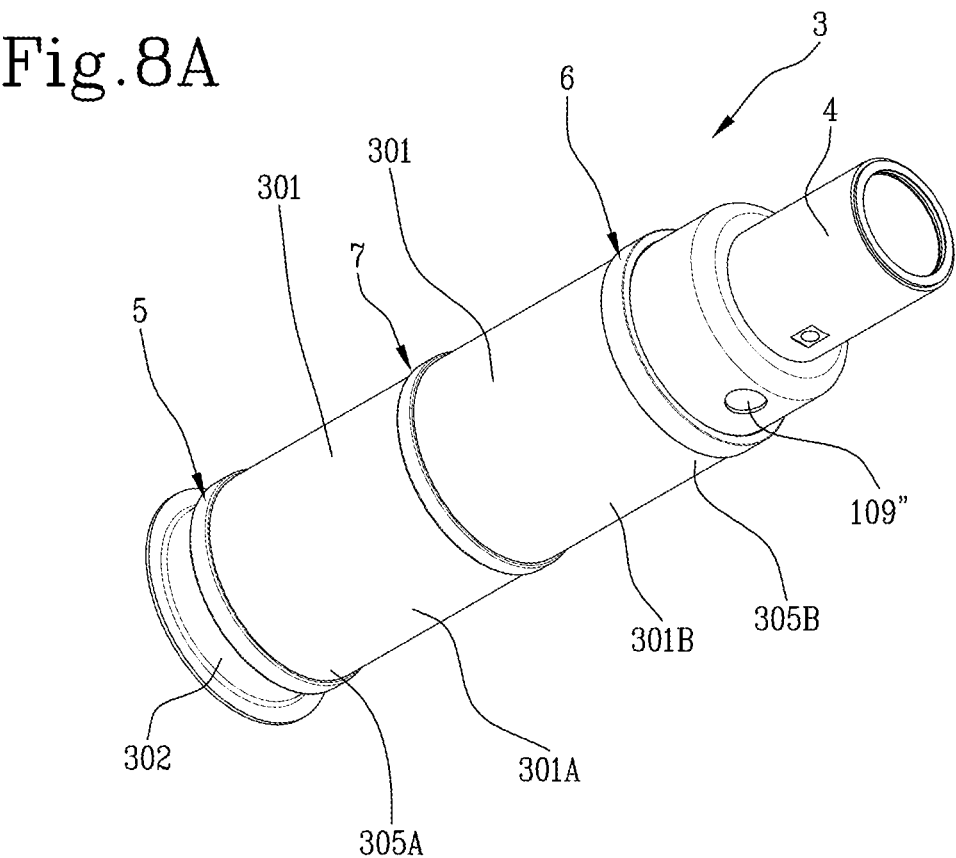
Figure 8B:
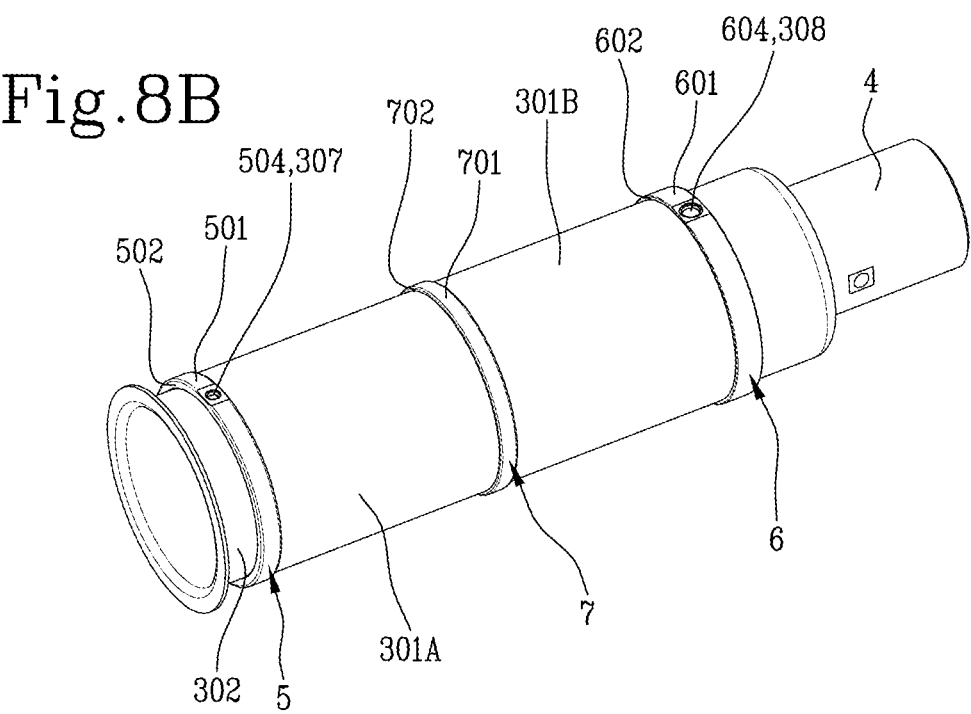
Figure 11A:
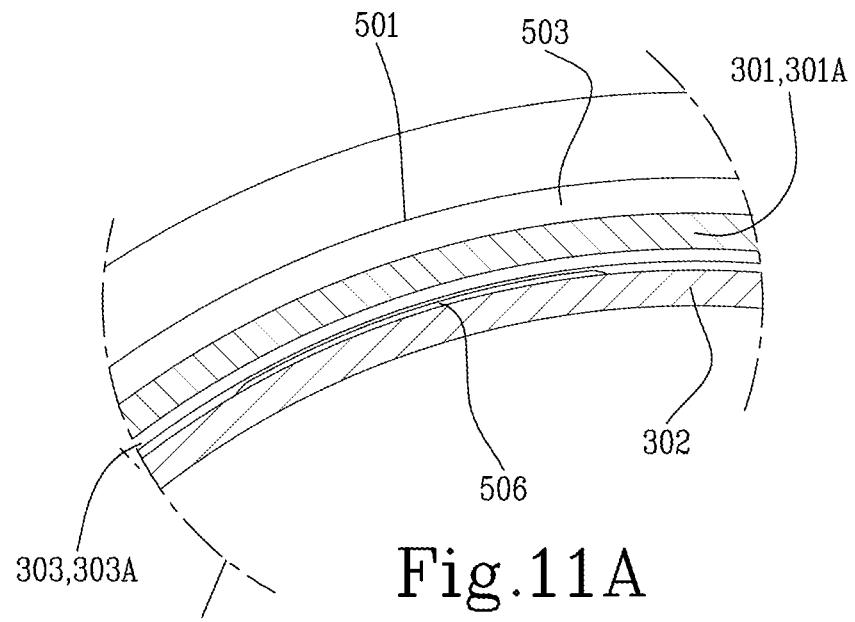
Figure 11:
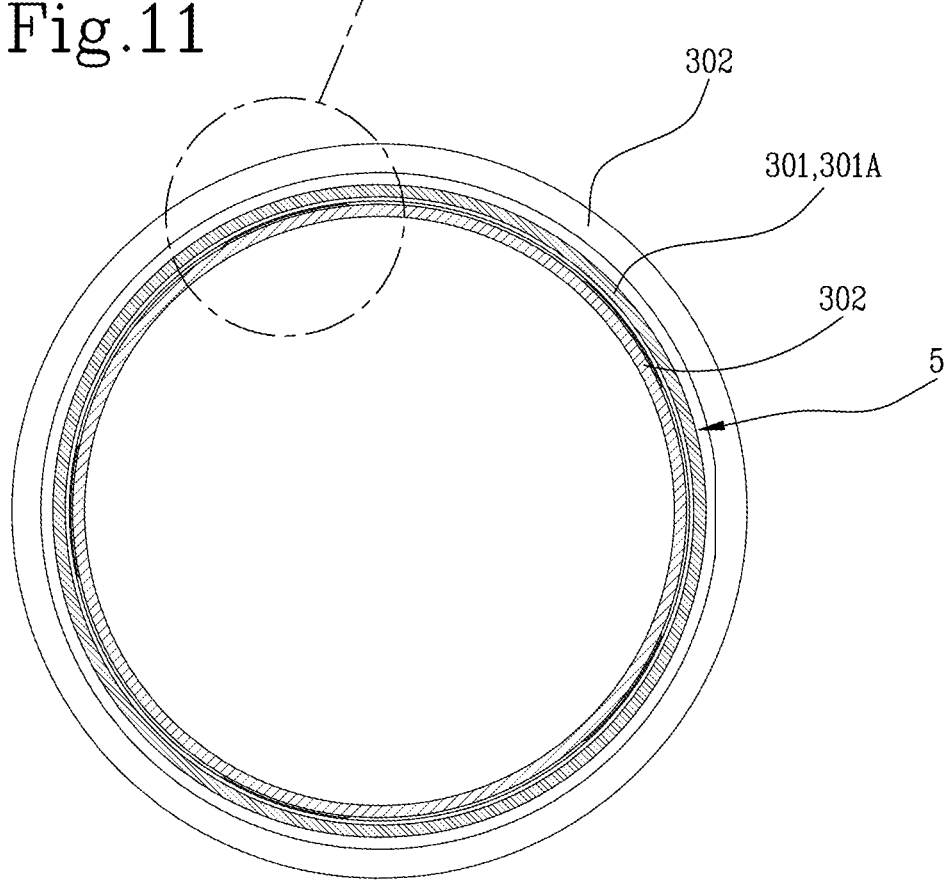
Figure 12:
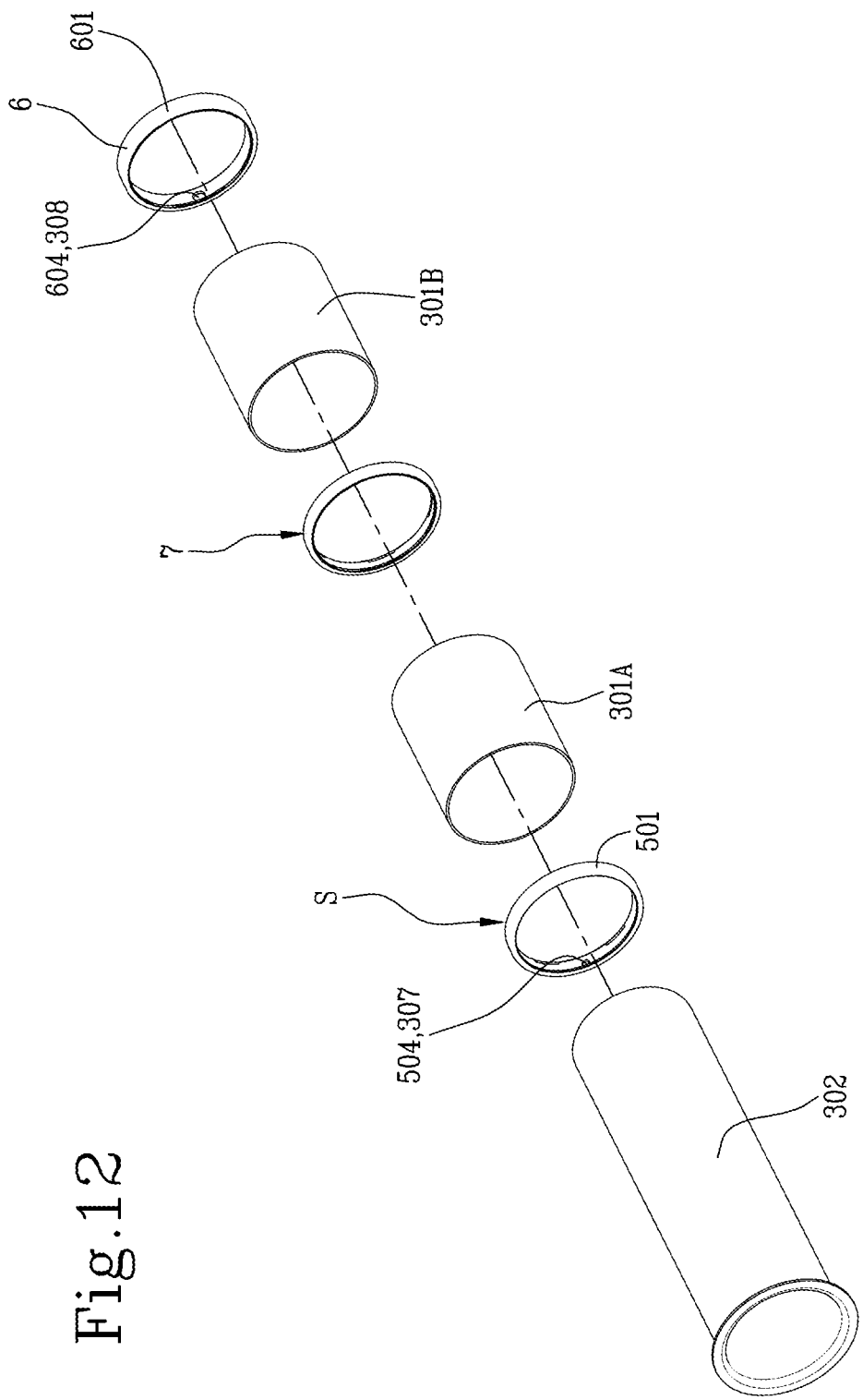
Figure 12A:
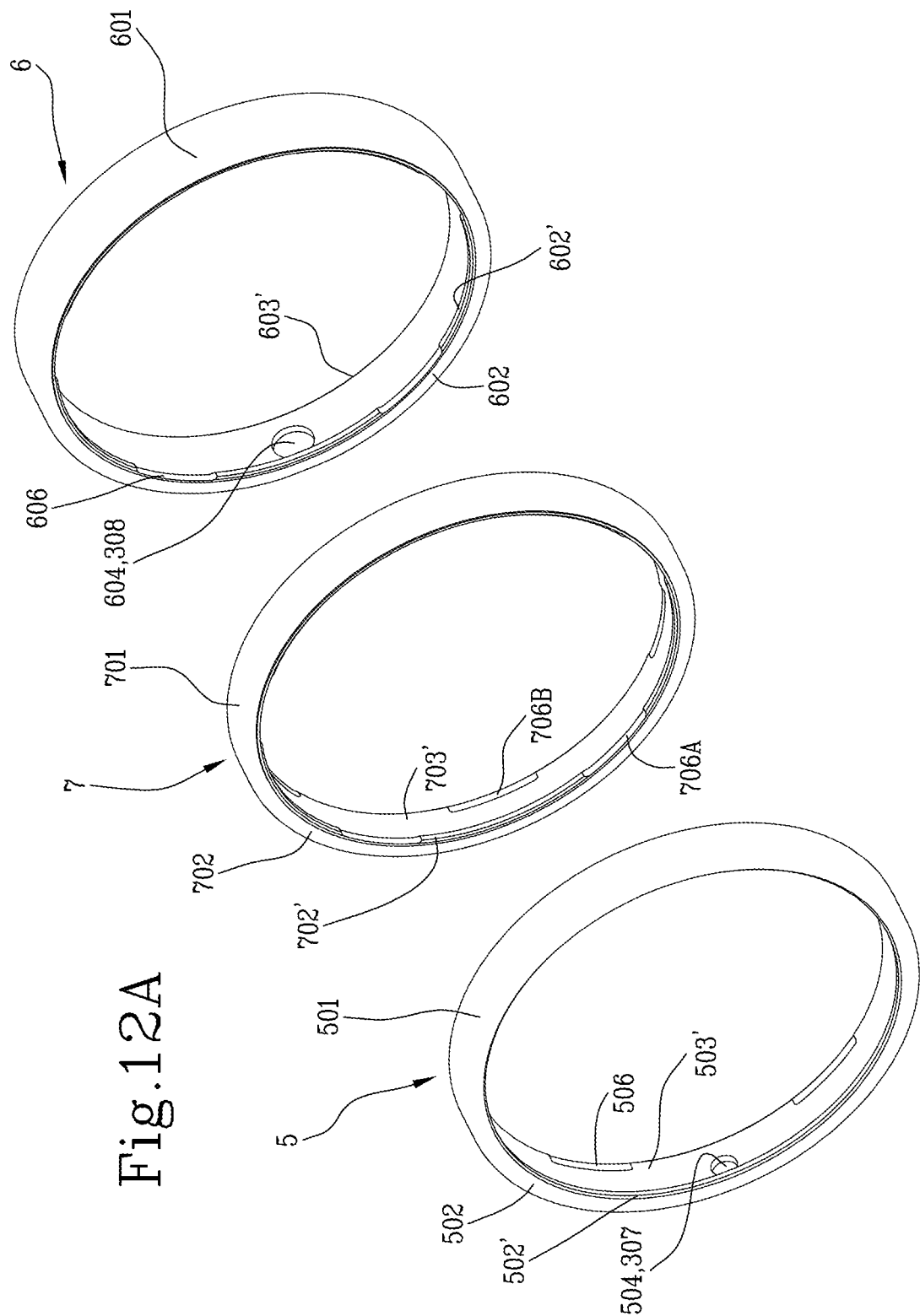
Figure 13:
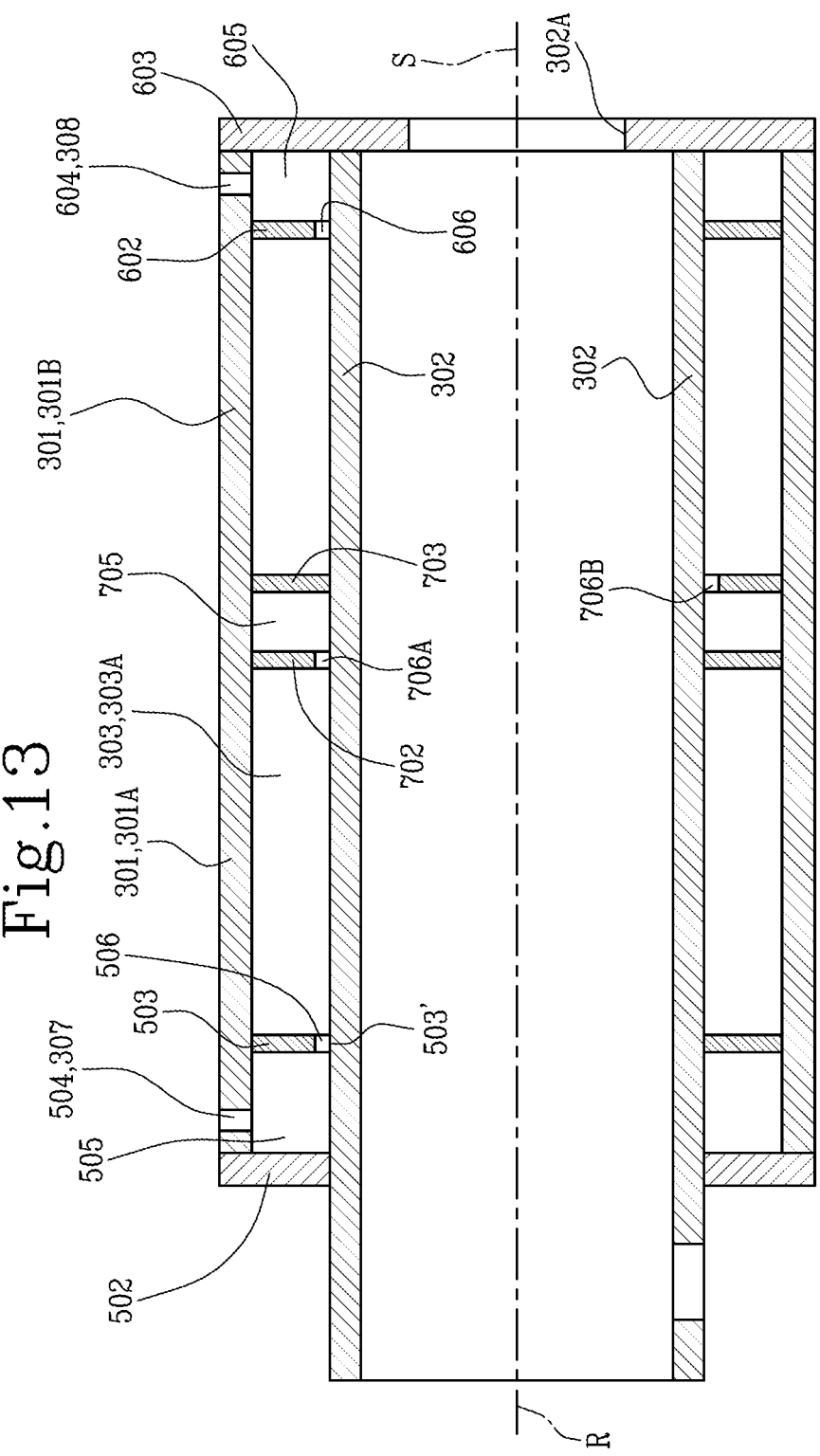
Figure 14:
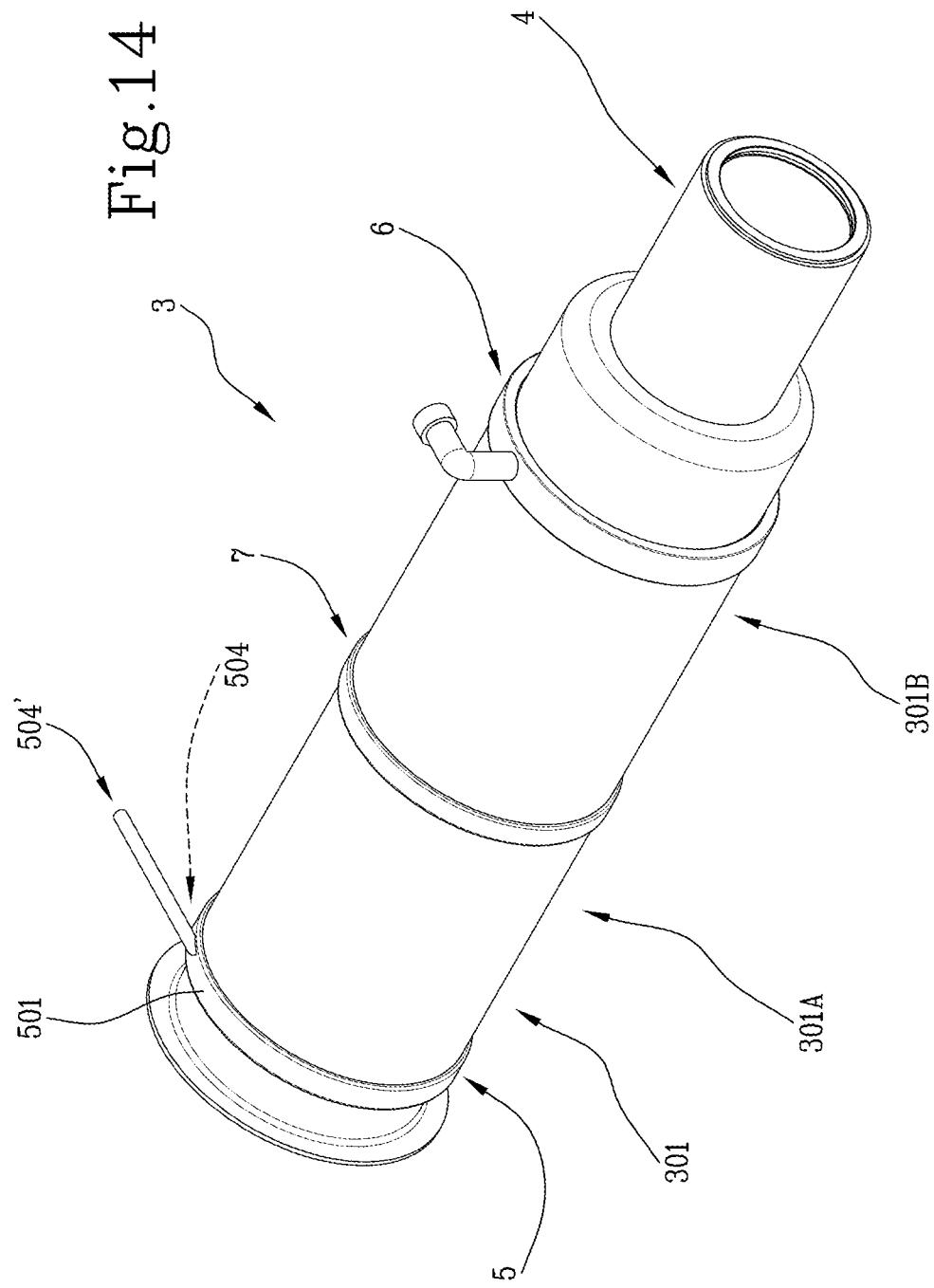

FIG. 7 schematically represents the layout of a dry expansion refrigerating system;

FIGS. 8A and 8B are, respectively, a first perspective view and a second perspective view of an evaporator in a further embodiment of the machine of FIG. 6;

FIGS. 9A and 9B are, respectively, a first side view and a second side view of the evaporator of FIG. 8A;

FIG. 10 illustrates a detail of a collector ring of the evaporator of FIG. 8A;

FIG. 10A shows a cross section of a further embodiment of the evaporator of the invention;

FIG. 10B shows a cross section of the embodiment of the evaporator of FIG. 8A;

FIG. 10C shows a detail of a turbulence ring from FIG. 10A or 10B;

FIG. 11 shows a cross section of the evaporator of FIG. 8A rotated by a right angle relative to the cross section of FIG. 10;

FIG. 11A shows a detail from the cross section of FIG. 11;

FIG. 12 shows an exploded view of the evaporator of FIG. 8A;

FIG. 12A illustrates a first collector ring, a second collector ring and a turbulence ring;

FIG. 13 illustrates an embodiment of the evaporator of FIG. 8A;

FIG. 14 illustrates an additional embodiment of the evaporator of FIG. 8A.

With reference to the drawings, the numeral 1 denotes a machine for making and dispensing liquid or semi-liquid food products. The products may also be cold or iced products such as, by way of non-limiting example, granitas, ice creams, sorbets, chilled patisserie products or soft ice creams.

In one embodiment, the machine 1 comprises a frame 101.

In one embodiment, the machine 1 comprises a container 102. The container 102 is configured to hold the product being processed before it is dispensed to a user. In one embodiment, the container 102 is cylindrical in shape. In this embodiment, the container 102 has an axis of symmetry S.

In one embodiment, the machine 1 comprises a dispenser 103. In one embodiment, the dispenser 103 is connected to the container 102. The dispenser 103 has two operating positions: an 'on' position, in which it enables the product to be dispensed, and an 'off' position, in which it prevents the product from being dispensed.

In one embodiment, the machine 1 comprises a dispensing mouth. The dispensing mouth 104 is in communication with the outside atmosphere and with an internal space 102' inside the container 102. The dispensing mouth 104 is connected to the dispenser 103. In the on position of the dispenser 103, communication between the internal space 102' inside the container 102 and the outside atmosphere is enabled. In the off position of the dispenser 103, communication between the internal space 102' inside the container 102 and the outside atmosphere is inhibited.

In one embodiment, the machine 1 comprises a stirrer 105. In one embodiment, the stirrer 105 is configured to rotate about a respective axis of rotation R inside the container 102. In one embodiment, the axis of rotation of the stirrer 105 and the axis of symmetry S of the container 102 coincide. In one embodiment, the stirrer 105 comprises a blade mounted to a shaft. The stirrer 105 is configured to mix the product being processed and prevent it from forming encrusted, frozen blocks.

In one embodiment, the machine 1 comprises an actuator 106. The actuator 106 is configured to drive the stirrer 105. In one embodiment, the actuator 106 is an electric motor which is engaged with the shaft of the stirrer 105 to transmit torque to the stirrer 105.

In one embodiment, the machine 1 comprises a control unit 107 configured to control the components of the machine 1 as a function of working data entered by a user.

In one embodiment, the control unit 107 is connected to the actuator 106. In one embodiment, the machine 1 comprises a user interface.

In one embodiment, the machine 1 comprises at least one sensor 108. In one embodiment, the at least one sensor 108 is configured to check that product is effectively dispensed when the dispenser 103 is turned on. In one embodiment, the at least one sensor 108 is configured to check that product is effectively dispensed when the stirrer 105 is turned on. In one embodiment, the control unit 107 is connected to the at least one sensor 108.

In one embodiment, the machine 1 comprises a pre-mixing tank 109. The pre-mixing tank 109 is connected to the container 102 by means of a filler pipe 109'. The filler pipe 109' leads into the container 102 through a filler opening 109".

In one embodiment, the machine 1 comprises a mixer 110. The mixer 110 is configured to mix the product inside the premixing tank 109 before being transferred into the container 102.

In one embodiment, the machine 1 comprises a thermal system 2. The thermal system 2 contains a heat exchanger fluid which circulates inside the thermal system 2 itself. In one embodiment, the thermal system is a refrigeration system 2 in which a refrigerant fluid circulates.

Hereinafter, the "heat exchanger fluid" will be referred to as "refrigerant fluid" and the "thermal system" will be referred to as "refrigeration system 2". It is understood that use of these terms is not intended to limit the scope of protection afforded by this disclosure in that what is described is only an embodiment of the thermal system and of the heat exchanger fluid.

The drawing 7 shows a standard refrigerating cycle. In this case, too, this is not intended as limiting the system represented in the drawing but only as an example of a thermal system. The refrigeration system 2, in other embodiments known to a person of average skill in the art, might be an absorption refrigeration system, a dry expansion system or a flooded evaporator system.

In one embodiment, the refrigeration system 2 comprises a compressor 201. The compressor 201 is configured to increase the pressure of the refrigerant fluid.

In one embodiment, the refrigeration system 2 comprises a condenser 202. The condenser 202 extracts heat from the refrigerant fluid and allows the latter to condense. The condenser 202 is located downstream of the compressor 201 in a circulation direction V of the refrigerant fluid.

In one embodiment, the refrigeration system 2 comprises a phase separator 203. The phase separator 203 is configured to separate the liquid phase from the non-condensed phase. The phase separator 203 is located downstream of the condenser 202 in the circulation direction V of the refrigerant fluid.

In one embodiment, the refrigeration system 2 comprises a pressure reducing element 204. In one embodiment, the pressure reducing element 204 is a throttle valve 204A. The pressure reducing element 204 is located downstream of the compressor 201 in a circulation direction V of the refrigerant fluid.

In one embodiment, the refrigeration system 2 comprises an evaporator 3. The evaporator 3 is configured to remove heat from the product being processed.

In one embodiment, the container 102 is associated with the evaporator 3. In one embodiment, the evaporator 3 and the container 102 have some parts in common. In one embodiment, the container 102 and the evaporator 3 coincide. In one embodiment, the container 102 is part of the evaporator 3.

In one embodiment the evaporator 3 comprises a first tubular element 301. The first tubular element 301 extends mainly along an axial direction parallel to the axis of symmetry S of the container 102.

In one embodiment the evaporator 3 comprises a second tubular element 302. The second tubular element 302 extends mainly along an axial direction parallel to the axis of symmetry S of the container 102. In one embodiment, the second tubular element 302 is smaller in diameter than the first tubular element 301.

The second tubular element 302 is disposed inside the first tubular element 301 to define an annular chamber 303 for circulating the heat exchanger fluid (hereinafter "annular circulation chamber 303").

In one embodiment, the second tubular element 302 coincides with the container 102 of the machine 1.

According to the invention, the annular circulation chamber 303 is defined by at least one microchannel 800, having a hydraulic diameter of between 3 mm and 13 mm.

Advantageously, as also observed experimentally this hydraulic diameter size (between 3 mm and 13 mm) allows establishing an optimum steady-state flow in terms of both heat exchange and load losses. In other words, the dimensional range forming the object of protection (hydraulic diameter between 3 mm and 13 mm) advantageously allows optimizing the thermodynamic cycle of the heat exchanger fluid.

In this disclosure, the hydraulic diameter is defined as 4 times the ratio between the area of the flow cross section and the effective perimeter of the flow cross section.

Preferably, as illustrated in FIGS. 1-5, the annular circulation chamber 303 is defined by a plurality of microchannels 800.

Preferably, the microchannels have a hydraulic diameter of between 3 mm and 13 mm.

It should be noted that the microchannels 800 are separated from each other by walls disposed in the annular circulation chamber 303, between the second tubular element 302 and the first tubular element 301.

Advantageously, the presence of these walls simplifies the construction of the exchanger because it allows mounting the first tubular element 301 to the outside of the second tubular element 302, ensuring that the microchannels have the required radial width.

The width of the microchannels in the radial direction R1 is very important because a width that is incorrect, that is, less than a predetermined value in one of the microchannels 800, can lead to unwanted load losses.

It should be noted that the resulting exchanger is simple, inexpensive and capable of high thermal efficiency operation in conventional refrigeration systems.

Each of the microchannels 800 preferably has a wall in common with a microchannel 800 adjacent to it.

Preferably, as illustrated in FIG. 4, the microchannels 800 are variable in cross section size along a main axis of extension S of the evaporator 3.

In particular, the microchannels 800 are preferably larger in outlet cross section size along the main axis of extension S of the evaporator 3 than they are in inlet cross section size (as illustrated in FIG. 4).

In particular, the microchannels 800 have a decreasing cross section size from inlet to outlet along the main axis of extension S.

According to another aspect, as illustrated in FIG. 5, the microchannels 800 have inside of them a plurality of protrusions 803 or cavities associated with the second tubular element 302 and designed to increase the heat exchange surface of the microchannels 800.

More specifically, the protrusions 803 or cavities increase the heat exchange surface on the side of the second tubular element 302.

According to yet another aspect, the microchannels 800 are defined by fins which are integral with the second tubular element 302 and which are formed on the outside surface of the second tubular element 302.

Preferably, according to one aspect, the fins are welded to the inside surface of the first tubular element 301.

According to yet another aspect, the microchannels 800 are defined by fins which are integral with the first tubular element 301 and which are formed on the inside surface of the first tubular element 301.

In this case, the fins are preferably welded to the outside surface of the second tubular element 302.

Preferably, the microchannels 800 have at least one curved stretch (and still more preferably, the microchannels 800 are entirely curved).

Preferably, the microchannels 800 extend in a helical path.

According to another aspect, the evaporator 3 comprises an inlet distribution element 805 associated with the evaporator 3 and connected to an inlet of the microchannels 800 to define an inlet chamber and to distribute to the microchannels 800 the heat exchanger fluid flowing into the evaporator 3.

According to another aspect, the inlet distribution element 805 preferably comprises an inlet pipe union designed to allow the heat exchanger fluid to flow into the inlet distribution element 805.

According to another aspect, the evaporator 3 comprises an outlet collector element 806 associated with the evaporator 3 and connected to an outlet of the microchannels 800 to define an outlet chamber and to extract the heat exchanger fluid flowing out of the microchannels 800.

According to another aspect, the outlet collector element 806 comprises an outlet pipe union designed to allow the heat exchanger fluid to be extracted from the outlet collector element 806.

According to another aspect, the microchannels 800 are distributed circumferentially about a main axis of extension S of the evaporator 3.

Preferably, the microchannels 800 are identical in size. In one embodiment, the evaporator 3 comprises an inlet aperture 307 configured to allow the refrigerant fluid from the pressure reducing element 204 to flow into it.

In one embodiment, the evaporator 3 comprises a discharge aperture 308 configured to allow the refrigerant fluid to flow out of the evaporator 3.

The machine 1 comprises a seal system 4.

In one embodiment, the second tubular element 302 comprises an actuator opening 302A. The actuator opening 302A allows the shaft of the stirrer 105 to pass through and to be connected to the actuator 106.

In one embodiment, the actuator opening 302A is configured to house the seal system 4 which is in turn mounted to the shaft of the stirrer 105 or to the shaft of the actuator 106.

In one embodiment, the filler opening 109" is formed on the second tubular element 302 to allow filling the container 102 (of the second tubular element 302) with product being processed.

In one embodiment, the evaporator 3 comprises a first collector ring 5.

The collector ring 5 defines the aforementioned inlet distribution element 805. In one embodiment, the first collector ring 5 is a single, integral component. In other possible embodiments, the first collector ring 5 may be made up of a plurality of parts which are not integral before assembly but which, in use, perform the same function as an integral ring. This embodiment is described further down with reference to FIG. 13.

In one embodiment, the first collector ring 5 comprises a cylindrical wall 501. In one embodiment, the first collector ring 5 comprises a first radial wall 502. In one embodiment, the first collector ring 5 comprises a second radial wall 503.

In one embodiment, the first radial wall 502 and the second radial wall 503 of the first collector ring 5 each have a respective lower cylindrical edge 502', 503'. In this embodiment, the first collector ring 5 has the shape of a C in which the first radial wall 502 and the second radial wall 503 are connected to the cylindrical wall 501.

In another embodiment, not illustrated in the accompanying drawings, the ring may comprise a further cylindrical wall to connect the first radial wall and the second radial wall at the respective ends of them opposite to those connected to the cylindrical wall 501.

In one embodiment, the first collector ring 5 comprises an access aperture 504. The access aperture 504 is, in one embodiment, formed on the cylindrical wall 501. In other embodiments, the access aperture 504 might be formed on the first radial wall 502 or on the second radial wall 503.

In one embodiment, the access aperture 504 is an aperture formed on the cylindrical wall 501 in such a way as to allow the refrigerant fluid to flow in the radial direction. This embodiment allows creating turbulence by placing an immediate obstacle in the flow path. In this embodiment, an access pipe 504', configured to channel the refrigerant fluid to the access aperture 504, has a direction of maximum radial extension.

In another embodiment, the access aperture 504 is an aperture formed on the cylindrical wall 501 in such a way as to allow the refrigerant fluid to flow in a tangential direction. The tangential direction is tangent to the first collector ring 5 and perpendicular to the radial direction and to the axis of rotation of the stirrer. This embodiment allows accelerating the inflow. In this embodiment, the access pipe 504' has a direction of maximum tangential extension. Increasing the speed of the refrigerant fluid flowing in allows reducing potential separation between the liquid phase and the vapour phase of the refrigerant fluid, which would considerably reduce efficiency. In the embodiments described, the inlet aperture 307 and the access aperture 504 are radial apertures. It should be noted, however, that the apertures may extend in directions other than the radial direction: for example tangential or in a direction with both tangential and radial components. Preferably, the aperture is tangential because this direction appears to give the most advantageous results.

In one embodiment, the first collector ring 5 is in contact with the outside surface of the second tubular element 302. In one embodiment, the lower cylindrical edge 502' of the first radial wall 502 is in contact with the outside surface of the second tubular element 302. In one embodiment, the lower cylindrical edge 503' of the second radial wall 503 is in contact with the outside surface of the second tubular element 302.

In one embodiment, the respective lower cylindrical edges 502', 503' of the first and second radial walls 502 and 503 are in contact with the outside surface of the second tubular element 302 to define a collector chamber 505.

In one embodiment, the first collector ring 5 comprises a collector aperture 506. In one embodiment, the first collector ring 5 comprises a plurality of collector apertures 506. The plurality of collector apertures 506 is configured to place the collector chamber 505 in communication with the annular circulation chamber 303.

In one embodiment, the first tubular element 301 comprises a first end 305A having a respective first end edge 305A'. In one embodiment, the first tubular element 301 comprises a second end 305B having a respective second end edge 305B'.

In one embodiment, the second radial wall 503 of the first collector ring 5 is in contact with the first end 305A of the first tubular element 301. In one embodiment, the second radial wall of the first collector ring 5 is in contact with the first end edge 305A' of the first tubular element 301.

In one embodiment, the plurality of collector apertures 506 is formed on the second radial wall 503 of the first collector ring 5.

In one embodiment, the plurality of collector apertures 506 is embodied by a plurality of grooves 506' formed on the lower cylindrical edge 503' of the second radial wall 503.

In one embodiment, the plurality of collector apertures 506 are disposed along the circumference of the first collector ring 5, equally spaced to be able to collect the refrigerant fluid uniformly.

In one embodiment, the first collector ring 5 is a distribution ring. This term is used to mean that the first collector ring 5 is configured to receive the refrigerant fluid through the access aperture 504, distribute the fluid to the entire collector chamber 505 and then cause it to flow into the annular circulation chamber 303.

In this embodiment, the access aperture 504 coincides with the inlet aperture 307 of the evaporator 3.

In one embodiment, the evaporator 3 comprises a second collector ring 6.

The collector ring 6 defines the aforementioned outlet collector element 806.

In this embodiment, it may be observed that the evaporator 3 comprises a plurality of collector rings 5, 6.

The second collector ring 6 comprises one or more of the features described above with reference to the first collector ring 5. Thus, in one embodiment, the second collector ring 6 may comprise one or more of the following features:
a cylindrical wall 601;
a first radial wall 602;
a second radial wall 603;
a lower cylindrical edge 602' of the first radial wall 602;
a lower cylindrical edge 603' of the second radial wall 603;
a plurality di collector apertures 606
an access aperture 604;
a collector chamber 605;
a plurality of grooves 606'.

In one embodiment, the second collector ring 6 is a discharge ring. This term is used to mean that the second collector ring 6 is configured to receive the refrigerant fluid from the annular circulation chamber 303, distribute the fluid to the entire respective collector chamber 605 and then convey it into the circuit in the direction of the compressor 201 through the access aperture 604. In this embodiment, the access aperture 604 of the second collector ring 6 coincides with the discharge aperture 308 of the evaporator 3.

More specifically, it is noted that in this embodiment—where the second collector ring 6 is a discharge ring—the second collector ring 6 is located downstream of the first collector ring 5 in the direction of circulation V of the refrigeration system 2.

More specifically, it is stressed that in one embodiment, the difference between the first collector ring 5 and the second collector ring 6 lies in their positioning in use. In effect, the second collector ring 6 is rotated about its diameter by a flat angle (180°) relative to the position of the first collector ring 5.

In one embodiment the evaporator 3 comprises a first stretch 301A of the first tubular element 301. In one embodiment the evaporator 3 comprises a second stretch 301B of the first tubular element 301.

In one embodiment, the inside surface of the first stretch 301A of the first tubular element 301 and the outside surface of the second tubular element 302 define a first portion 303A of the annular circulation chamber 303.

In one embodiment, the inside surface of the second stretch 301B of the first tubular element 301 and the outside surface of the second tubular element 302 define a second portion 303B of the annular circulation chamber 303.

In one embodiment, the evaporator 3 comprises a turbulence ring 7.

In one embodiment, the turbulence ring 7 is in contact with the second tubular element 302. In one embodiment, the turbulence ring 7 is in contact with the first tubular element 301.

In one embodiment, the turbulence ring 7 comprises a cylindrical wall 701. In one embodiment, the turbulence ring 7 comprises a first radial wall 702. In one embodiment, the turbulence ring 7 comprises a second radial wall 703.

In one embodiment, the first radial wall 702 and the second radial wall 703 each comprise a lower cylindrical edge 702', 703'.

In one embodiment, the turbulence ring 7 is in contact with the outside surface of the second tubular element 302 to define a turbulence chamber 705.

In one embodiment, the lower cylindrical edge 702' of the first radial wall 702 of the turbulence ring 7 is in contact with the outside surface of the second tubular element 302.

In one embodiment, the lower cylindrical edge 703' of the second radial wall 703 of the turbulence ring 7 is in contact with the outside surface of the second tubular element 302.

In one embodiment, the respective lower cylindrical edges 702', 703' of the first and second radial walls 702 and 703 of the turbulence ring 7 are in contact with the outside surface of the second tubular element 302 to define the turbulence chamber 705.

In one embodiment, the turbulence ring 7 comprises a first plurality of turbulence apertures 706A. In one embodiment, the turbulence ring 7 comprises a second plurality of turbulence apertures 706B.

In one embodiment, the first plurality of turbulence apertures 706A is disposed on the first radial wall 702 of the turbulence ring 7. In one embodiment, the second plurality of turbulence apertures 706B is disposed on the second radial wall 703 of the turbulence ring 7.

In one embodiment, the first plurality of turbulence apertures 706A leads into the turbulence chamber 705 and into the first portion 303A of the annular circulation chamber 303.

In one embodiment, the second plurality of turbulence apertures 706B leads into the turbulence chamber 705 and into the second portion 303B of the annular circulation chamber 303.

In one embodiment (for example, the one illustrated in FIG. 10A), the evaporator 3 comprises a further turbulence ring 7' to form a plurality of turbulence rings.

In one embodiment, illustrated in FIG. 13, the first collector ring 5, the second collector ring 6 and the turbulence ring 7 are illustrated in an alternative embodiment falling within the scope of protection of the claims.

More specifically, in this embodiment, the first collector ring 5, the second collector ring 6 and the turbulence ring 7 each comprise the respective first radial wall 502, 602, 702 and the second radial wall 503, 603, 703. The two respective radial walls of each ring are, however, connected in use by the first tubular element 301. In this embodiment, the inlet aperture 307 and the discharge aperture 308 are formed on the first tubular element 301. The inlet aperture 307 and the discharge aperture 308 are formed on the first tubular element 301, at the collector chamber 505 of the first collector ring 5 and of the collector chamber 605 of the second collector ring 6, respectively.

In this embodiment, the first radial wall 502 and the second radial wall 503 of the first collector ring 5 each comprise a respective upper cylindrical edge.

In this embodiment, the first radial wall 602 and the second radial wall 603 of the second collector ring 6 each comprise a respective upper cylindrical edge.

In this embodiment, the first radial wall 702 and the second radial wall 703 of the turbulence ring 7 each comprise a respective upper cylindrical edge.

In one embodiment, the evaporator 3 is located in the internal space 102' inside the container 102 and the stirrer 105 is configured to rotate with its blade disposed on the outside surface of the first tubular element 301.

In one embodiment, the container 102 corresponds to the second tubular element and the stirrer 105 is configured to rotate with its blade in contact with the inside surface of the second tubular element 302.

This disclosure also provides a method for making and dispensing liquid or semi-liquid food products. Preferably, the method relates to the production of cold or iced liquid or semi-liquid food products such as ice cream, sorbets, soft ice cream, chilled patisserie products and granitas. In one embodiment, the method comprises a step of holding the product in a container 102.

In one embodiment, the method comprises a step of dispensing. In the step of dispensing, a dispenser 103 varies its position from on to off and vice versa, to allow or inhibit dispensing of the product from the container 102.

In one embodiment, the method comprises a step of pre-mixing. In the step of pre-mixing, a pre-mixing tank 109 contains a semi-finished product and mixes it using a mixer 110.

In one embodiment, the method comprises a step of filling the container 102. In this step, the semi-finished product in the pre-mixing tank 109 is channelled through a filler pipe 109' into the container 102 by way of a filler aperture.

In one embodiment, the method comprises of step of preparing a thermal system 2 including a compressor 201, a condenser 202, a pressure reducing element 204 and an evaporator 3 associated with the container 102 which holds the product to be dispensed.

In one embodiment, the method comprises a step of mixing the product being processed inside the container 102 with a stirrer 105.

In one embodiment, the method comprises a step of compressing a heat exchanger fluid.

In one embodiment, the method comprises a step of condensing a heat exchanger fluid.

In one embodiment, the method comprises a step of separating the phases of the heat exchanger fluid.

In one embodiment, the method comprises a step of decompressing the heat exchanger fluid.

In one embodiment, the method comprises a step of evaporating the heat exchanger fluid.

In one embodiment, the method comprises a step of thermally conditioning the product to be dispensed with the thermal system 2, which has a heat exchanger fluid flowing inside it. In one embodiment, the step of evaporating the heat exchanger fluid coincides with the step of thermally conditioning the product being processed.

In one embodiment, thermal conditioning comprises a step of receiving the heat exchanger fluid through an inlet aperture 307.

In one embodiment, the step of receiving the heat exchanger fluid occurs inside a first collector ring 5.

In one embodiment, thermal conditioning comprises a step of redistributing the heat exchanger fluid throughout the space inside a collector chamber 505, defined by the first collector ring 5.

In one embodiment, thermal conditioning comprises a step of feeding the fluid into a first portion 303A of an annular circulation chamber 303 through a collector aperture 506 formed on the first collector ring 5. In one embodiment, the step of feeding the fluid occurs through a plurality of collector apertures 506 formed on the first collector ring 5.

In one embodiment, the method comprises a step of exchanging heat. In this step, the heat exchanger fluid, contained in a first portion 303A of the annular circulation chamber 303 flows in a circulation direction V and exchanges heat with the product being processed.

In one embodiment, the method comprises a step of induced turbulence.

In the step of induced turbulence, the heat exchanger fluid flows from the first portion 303A of the annular circulation chamber 303 and into a turbulence ring 7. In one embodiment—where the turbulence ring 7 is provided with a first plurality of turbulence apertures 706A disposed on a first radial wall 702 of the turbulence ring 7—the refrigerant fluid reaches a turbulence chamber 705 defined by the turbulence ring 7. In one embodiment—where the turbulence ring 7 is provided with a second plurality of turbulence apertures 706B disposed on a second radial wall 703 of the turbulence ring 7 the step of induced turbulence comprises a step of diverting the flow of the heat exchanger fluid. This diversion is due to the fact that the second plurality of turbulence apertures 706B is not aligned with the direction of the heat exchanger fluid when it enters the turbulence chamber 705. In effect, when it enters the turbulence chamber 705, the heat exchanger fluid collides with the second radial wall 703 and is diverted in the direction of the second plurality of turbulence apertures 706B.

In one embodiment, the step of induced turbulence comprises a step of returning the heat exchanger fluid into a second portion 303B of the annular circulation chamber 303.

In one embodiment, thermal conditioning comprises an additional step of exchanging heat, which occurs in the second portion 303B of the annular circulation chamber 303.

In one embodiment, thermal conditioning comprises a step of discharging the heat exchanger fluid through a discharge aperture 308.

In one embodiment, the step of discharging the heat exchanger fluid occurs inside a second collector ring 6.

In one embodiment, the method comprises a step of receiving the heat exchanger fluid from the second portion 303B of the annular circulation chamber 303 and causing it to flow into a respective collector chamber 605 of the second collector ring 6 through a respective plurality of collector apertures 606 on the second collector ring 6.

In one embodiment, thermal conditioning comprises a step of conveying the heat exchanger fluid throughout the space inside the collector chamber 605.

In one embodiment, thermal conditioning comprises a step of discharging the heat exchanger fluid from the collector chamber 606 of the second collector ring 6 through the discharge aperture 308 and towards the compressor 201 of the thermal system 2.

The invention claimed is:

1. A machine for making and dispensing liquid or semi-liquid food products, comprising:
   a container for a product to be dispensed;
   a dispenser which is connected to the container and which is switchable between on and off positions to respectively allow or inhibit dispensing of the product from the container;
   a stirrer rotatable about a respective axis of rotation and mounted inside the container to mix the product;
   a thermal system having a circuit with a heat exchanger fluid flowing through the circuit and comprising, along the circuit:
      a compressor;
      a condenser;
      a pressure reducing element;
      an evaporator operatively connected with the container and including an inlet aperture for the heat exchanger fluid, a discharge aperture for the heat exchanger fluid, a first tubular element and a second tubular element coaxial with the first tubular element and having an axial direction of extension and a radial direction of extension; the second tubular element extending at least along an axial direction parallel to the axis of rotation and being disposed inside the first tubular element to define an annular chamber for circulating the heat exchanger fluid between an outside surface of the second tubular element and an inside surface of the first tubular element;
      wherein the annular circulation chamber is defined by at least one microchannel, the at least one microchannel having a hydraulic diameter from 3 mm to 13 mm;
      wherein the at least one microchannel includes a plurality of miorochannels having a hydraulic diameter from 3 mm to 13 mm,
      wherein the plurality of miorochannels are variable in cross section size along a main axis of extension of the evaporator;
      wherein the plurality of microchannels are larger in outlet cross section size along the main axis of extension of the evaporator than they are in inlet cross section size.

2. The machine according to claim 1, wherein each of the plurality of microchannels has a wall in common with an adjacent one of the plurality of microchannels.

3. The machine according to claim 1, wherein the plurality of microchannels include internally a plurality of protrusions or cavities connected with the second tubular element and configured to increase a heat exchange surface of the plurality of microchannels.

4. The machine according to claim 1, wherein the plurality of microchannels are defined by fins which are integral with the second tubular element and which are formed on the outside surface of the second tubular element, the fins being welded to the inside surface of the first tubular element.

5. The machine according to claim 1, wherein the plurality of microchannels include at least one curved stretch.

6. The machine according to claim 1, wherein the plurality of microchannels extend in a helical path.

7. The machine according to claim 1, and further comprising an inlet distribution element operatively connected with the evaporator and connected to an inlet of the plurality of microchannels to define an inlet chamber and to distribute to the plurality of microchannels the heat exchanger fluid flowing into the evaporator.

8. The machine according to claim 7, wherein the inlet distribution element comprises an inlet pipe union configured to allow the heat exchanger fluid to flow into the inlet distribution element.

9. The machine according to claim 1, and further, comprising an outlet collector element operatively connected with the evaporator and connected to an outlet of the plurality of microchannels to define an outlet chamber and to extract the heat exchanger fluid flowing out of the plurality of microchannels.

10. The machine according to claim 9, wherein the outlet collector element comprises an outlet pipe union configured to allow the heat exchanger fluid to be extracted from the outlet collector element.

11. The machine according to claim 1, wherein the plurality of microchannels are distributed circumferentially about the main axis of extension of the evaporator.

12. The machine according to claim 1, wherein the plurality of microchannels are identical in size.

13. The machine according to claim 1, wherein the evaporator comprises a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid.

14. The machine according to claim 13, wherein the first collector ring comprises a cylindrical wall, a first radial wall and a second radial wall, the first radial wall and the second radial wall being in contact with the outside surface of the second tubular element to define the collector chamber.

15. The machine according to claim 13, wherein the first collector ring comprises an additional collector aperture to form a plurality of collector apertures.

16. The machine according to claim 13, and further comprising a second collector ring to form a plurality of collector rings, each having a respective collector chamber and a respective collector aperture.

17. The machine according to claim 16, wherein the second collector ring is located upstream of the first collector ring along a flow of the heat exchanger fluid directed from the inlet aperture of the thermal system to the discharge aperture of the thermal system.

18. The machine according to claim 16, wherein the second collector ring includes a radial wall and a second axial end of the first tubular element is in contact with the radial wall of the second collector ring.

19. The machine according to claim 13, wherein the stirrer is disposed inside of the second tubular element to mix the product in contact with an inside surface of the second tubular element.

20. The machine according to claim 1, wherein the stirrer is disposed on an outside of the first tubular element to mix the product in contact with an outside surface of the first tubular element.

21. A machine for making and dispensing liquid or semi-liquid food products comprising:
   a container for a product to be dispensed;
   a dispenser which is connected to the container and which is switchable between on and off positions to respectively allow or inhibit dispensing of the product from the container;
   a stirrer rotatable about a respective axis of rotation and mounted inside the container to mix the product;
   a thermal system having a circuit with a heat exchanger fluid flowing through the circuit and comprising, along the circuit:
   a compressor;
   a condenser;
   a pressure reducing element;
   an evaporator operatively connected with the container and including an inlet aperture for the heat exchanger fluid, a discharge aperture for the heat exchanger fluid, a first tubular element and a second tubular element coaxial with the first tubular element and having an axial direction of extension and a radial direction of extension; the second tubular element extending at least along an axial direction parallel to the axis of rotation and being disposed inside the first tubular element to define an annular chamber for circulating the heat exchanger fluid between an outside surface of the second tubular element and an inside surface of the first tubular element;
   wherein the annular circulation chamber is defined by at least one microchannel, the at least one microchannel having a hydraulic diameter from 3 mm to 13 mm;
   wherein the at least one microchannel includes a plurality of microchannels having a hydraulic diameter from 3 mm to 13 mm;
   wherein the plurality of microchannels are variable in cross section size along a main axis of extension of the evaporator;
   wherein the evaporator comprises a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid;
   wherein the first collector ring comprises an additional collector aperture to form a plurality of collector apertures:
   wherein the first collector ring comprises a radial wall in contact with the outside surface of the second tubular element;
   wherein the plurality of collector apertures are formed on the radial wall of the first collector ring and the plurality of collector apertures are equispaced to allow the heat exchanger fluid to be uniformly distributed.

22. A machine for making and dispensing liquid or semi-liquid food products, comprising:
   a container for a product to be dispensed;
   a dispenser which is connected to the container and which is switchable between on and off positions to respectively allow or inhibit dispensing of the product from the container;
   a stirrer rotatable about a respective axis of rotation and mounted inside the container to mix the product;
   a thermal system having a circuit with a heat exchanger fluid flowing through the circuit and comprising, along the circuit:
   a compressor;
   a condenser;
   a pressure reducing element;
   an evaporator operatively connected with the container and including an inlet aperture for the heat exchanger fluid, a discharge aperture for the heat exchanger fluid, a first tubular element and a second tubular element coaxial with the first tubular element and having an axial direction of extension and a radial direction of extension; the second tubular element extending at least along an axial direction parallel to the axis of rotation and being disposed inside the first tubular element to define an annular chamber for circulating the heat exchanger fluid between an outside surface of the second tubular element and an inside surface of the first tubular element;
   wherein the annular circulation chamber is defined by at least one microchannel, the at least one microchannel having a hydraulic diameter from 3 mm to 13 mm;
   wherein the at least one microchannel includes a plurality of microchannels having a hydraulic diameter from 3 mm to 13 mm;

wherein the plurality of microchannels are variable in cross section size along a main axis of extension of the evaporator;

wherein the evaporator comprises a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid;

wherein the first collector ring comprises a cylindrical wall;

wherein the inlet aperture is disposed on the cylindrical wall of the first collector ring.

23. A machine for making and dispensing liquid or semi-liquid food products, comprising:

a container for a product to be dispensed;

a dispenser which is connected to the container and which is switchable between on and off positions to respectively allow or inhibit dispensing of the product from the container;

a stirrer rotatable about a respective axis of rotation and mounted inside the container to mix the product;

wherein the evaporator comprises a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid;

wherein the first collector ring comprises a radial wall in contact with the outside surface of the second tubular element;

wherein a first axial end of the first tubular element is in contact with the radial wall of the first collector ring.

24. A machine for making and dispensing liquid or semi-liquid food products, comprising:

a container for a product to be dispensed;

a dispenser which is connected to the container and which is switchable between on and off positions to respectively allow or inhibit dispensing of the product from the container;

a stirrer rotatable about a respective axis of rotation and mounted inside the container to mix the product;

a thermal system having a circuit with a heat exchanger fluid flowing through the circuit and comprising, along the circuit:

a compressor;

a condenser;

a pressure reducing element;

an evaporator operatively connected with the container and including an inlet aperture for the heat exchanger fluid, a discharge aperture for the heat exchanger fluid, first tubular element and a second tubular element coaxial with the first tubular element and having an axial direction of extension and a radial direction of extension; the second tubular element extending at least along an axial direction parallel to the axis of rotation and being disposed inside the first tubular element to define an annular chamber for circulating the heat enhancer fluid between an outside surface of the second tubular element and an inside surface of the first tubular element;

wherein the annular circulation chamber is defined by at least one microchannel the at least one microchannel having a hydraulic diameter from 3 mm to 13 mm;

wherein the at least one microchannel includes a plurality of microchannels having a hydraulic diameter from 3 mm to 13 mm;

wherein the plurality of microchannels are variable in cross section size along a main axis of extension of the evaporator;

wherein the evaporator comprises a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid;

a second collector ring to form a plurality of collector rings, each having a respective collector chamber and a respective collector aperture, the second collector ring including a cylindrical wall and a radial wall;

wherein the second collector ring comprises an additional collector aperture to form a plurality of collector apertures formed on the radial wall of the second collector ring and wherein the discharge aperture is disposed on the cylindrical wall of the second collector ring.

25. A machine for making and dispensing liquid or semi-liquid food products, comprising:

a container for a product to be dispensed;

a dispenser which is connected to the container and which is switchable between on and off positions to respectively allow or inhibit dispensing of the product from the container;

a stirrer rotatable about a respective axis of rotation and mounted inside the container to mix the product;

a thermal system having a circuit with a heat exchanger fluid flowing through the circuit and comprising, along the circuit:

a compressor;

a condenser;

a pressure reducing element;

an evaporator operatively connected with the container and including an inlet aperture for the heat exchanger fluid, a discharge aperture for the heat exchanger fluid, a first tubular element and a second tubular element coaxial with the first tubular element and having an axial direction of extension and a radial direction of extension; the second tubular element extending at least along an axial direction parallel to the axis of rotation and being disposed inside the first tubular element to define an annular chamber for circulating the heat exchanger fluid between an outside surface of the second tubular element and an inside surface of the first tubular element;

wherein the annular circulation chamber is defined by at least one microchannel, the at least one microchannel having a hydraulic diameter from 3 mm to 13 mm;

wherein the evaporator comprises:

a first collector ring coaxial with the second tubular element and externally in contact with the second tubular element, the first collector ring defining a collector chamber and also comprising a collector aperture in communication with the collector chamber and with the annular chamber for circulating the heat exchanger fluid to allow fluid communication between the collector chamber and the annular chamber for circulating the heat exchanger fluid;

a second collector ring to form a plurality of collector rings, each having a respective collector chamber and a respective collector aperture;

a turbulence ring, coaxial with the second tubular element and externally in contact with the second tubular element, the turbulence ring defining a turbulence chamber and wherein the first tubular element comprises a first stretch, in contact with the first collector ring and with the turbulence ring to define a first portion of the annular chamber for circulating the heat exchanger fluid, and a second stretch in contact with the second collector ring and with the turbulence ring to define a second portion of the annular chamber for circulating the heat exchanger fluid.

26. The machine according to claim 25, wherein the turbulence ring includes a first radial wall and a second radial wall, the first radial wall comprising a first turbulence aperture, in communication with the turbulence chamber and with the first portion of the annular chamber for circulating the heat exchanger fluid, and wherein the second radial wall of the turbulence ring comprises a second turbulence aperture, in communication with the turbulence chamber and with the second portion of the annular chamber for circulating the heat exchanger fluid.

* * * * *